(12) United States Patent
Georgoulias

(10) Patent No.: US 9,924,623 B2
(45) Date of Patent: Mar. 27, 2018

(54) AERATOR TINE HOLDER

(75) Inventor: Chris M. Georgoulias, Raleigh, NC (US)

(73) Assignee: DEERE & COMPANY, Moline, IL (US)

( * ) Notice: Subject to any disclaimer, the term of this patent is extended or adjusted under 35 U.S.C. 154(b) by 667 days.

(21) Appl. No.: 13/189,923

(22) Filed: Jul. 25, 2011

(65) Prior Publication Data

US 2013/0025891 A1 Jan. 31, 2013

(51) Int. Cl.
*A01B 45/02* (2006.01)

(52) U.S. Cl.
CPC .................. *A01B 45/023* (2013.01)

(58) Field of Classification Search
CPC ..... A01B 45/023; A01B 45/02; A01B 45/026; A01B 45/00
USPC .......................... 172/21, 22; 269/8
See application file for complete search history.

(56) References Cited

U.S. PATENT DOCUMENTS

| | | | | |
|---|---|---|---|---|
| 2,638,831 A * | 5/1953 | Ferguson et al. | ............... | 172/22 |
| 3,031,669 A * | 5/1962 | Lawson | ............... | 33/613 |
| 3,575,435 A * | 4/1971 | Lemanski | ............... | 279/123 |
| 4,204,576 A * | 5/1980 | Mullet et al. | ............... | 172/22 |
| 4,392,643 A * | 7/1983 | Campeau | ............... | 269/136 |
| 4,569,511 A * | 2/1986 | Bell, Jr. | ............... | 269/276 |
| 4,574,890 A | 3/1986 | Hansen et al. | | |
| 4,638,867 A | 1/1987 | Hansen et al. | | |
| 4,794,961 A * | 1/1989 | Bonac | ............... | 144/212 |
| 5,711,515 A * | 1/1998 | Nishimura | ............... | 269/276 |
| 6,361,034 B1 * | 3/2002 | Wolfe | ............... | 269/8 |
| 6,561,282 B2 * | 5/2003 | Smith | ............... | 172/21 |
| 7,108,461 B1 * | 9/2006 | Colburn et al. | ............... | 409/131 |
| 7,600,573 B2 | 10/2009 | Langworthy et al. | | |
| 7,631,434 B1 * | 12/2009 | Carter, Jr. | ............... | 33/293 |
| 2007/0182109 A1 * | 8/2007 | Considine et al. | ............... | 279/128 |

OTHER PUBLICATIONS

Deere. Product Manuals, Operating-Machine. [Retrieved on Jul. 15, 2011]. Retrieved from the Internet:<URLhttp://manuals.deere.com/cceomview/omtcu29515_k0/Output/OMTCU29515_k06.html>.
Toro ProCore 648 Aerator Operator's Manual. 2005 by The Toro Company. Retrieved from the Internet<URL:http://www.towgreen.co.kr/_admin/product/data/20061207095004M.pdf>.

* cited by examiner

Primary Examiner — Jamie L McGowan

(57) ABSTRACT

An aerator tine holder includes a clamp block removably attached to a base. Each of the clamp block and the base have a plurality of semicylindrical channels that when attached together form a plurality of cylindrical bores holding cylindrical tines. One or more magnets in the base and/or clamp block may be used to position the tines while the clamp block is removed from the base.

12 Claims, 2 Drawing Sheets

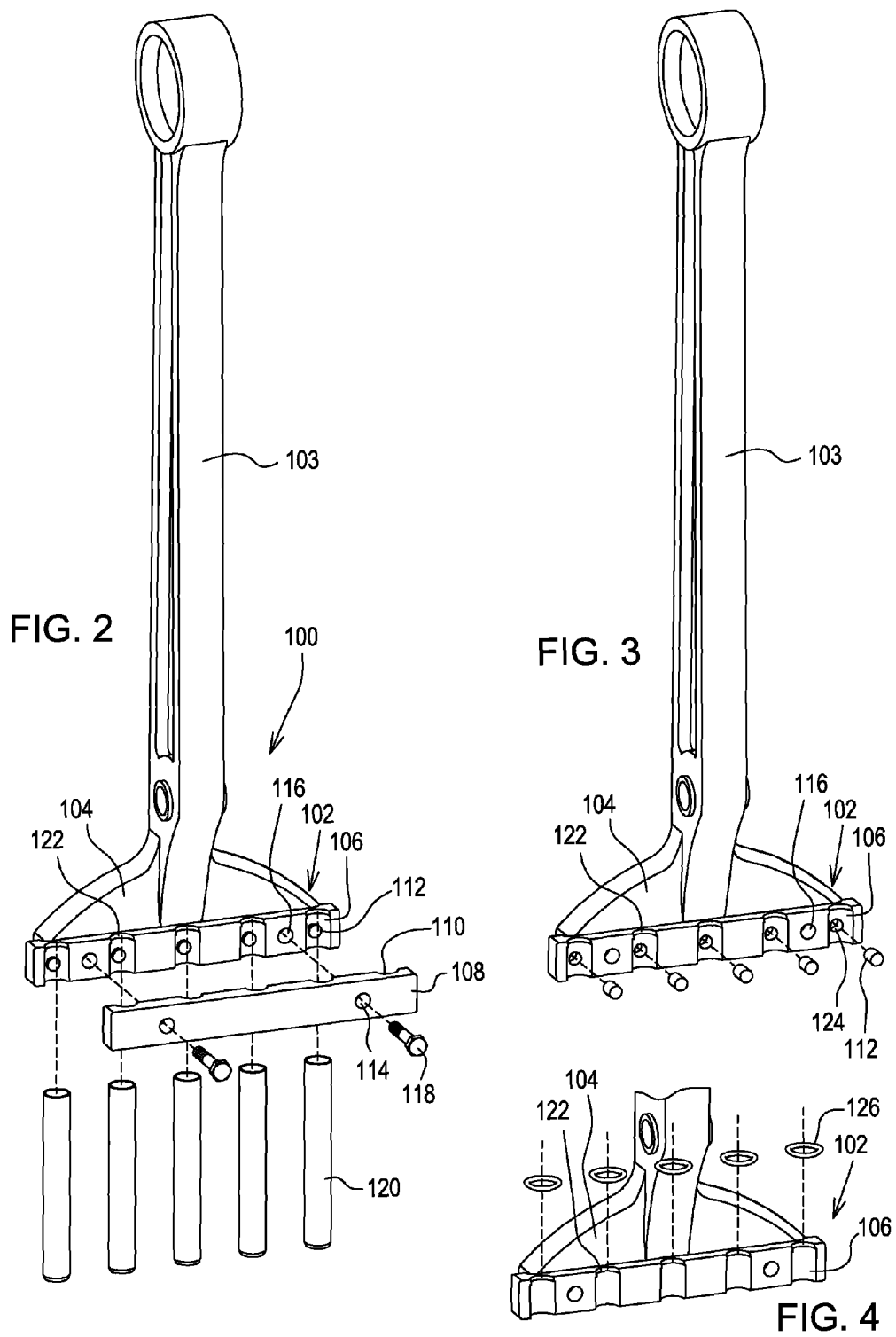

AERATOR TINE HOLDER

FIELD OF THE INVENTION

This invention relates to aerators for aerating ground surfaces. More specifically, the invention relates to a tine holder for an aerator.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have tines that repeatedly penetrate the ground surface, forming a plurality of holes so that the ground surface is aerated, to improve growth of the grass or other material and enhance the condition of the surface for playing purposes.

Aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel. For example, three, four or five tines are typically carried by each of multiple tine holders on the aerator, and are held in place by one or more clamp blocks bolded to a rectangular body. When bolted together, the tine holder forms several cylindrical bores that hold the upper ends of several tines.

When an aerator is used, tines must be changed periodically because the tines wear quickly due to abrasion by the soil. Removing and replacing one or more tines is time intensive because it requires loosening the clamp block that holds several tines in place until the tines become loose in the holder. If even one tine is replaced, the other tines, as well as the new tines, must be repositioned and held in place in the tine holder before the clamp block may be tightened again.

U.S. Pat. No. 7,600,573 relates to a tine holder for a turf aerator in which the upper end of each tine is inserted into a tapered collar that is received in each tapered bore. The collar is split so that it contracts as the collar is slid into the tapered bore. A special tool is provided to urge the collar to slide into place.

An aerator tine holder is needed that reduces or minimizes the time required to change one or more tines in an aerator. A tine holder for an aerator is needed that does not require repositioning several tines held by a clamp block. A tine holder for an aerator is needed that does not require special tools to remove and replace tines.

SUMMARY OF THE INVENTION

A tine holder for an aerator includes a base attached to a vehicle, having a plurality of generally vertically aligned semicylindrical channels therein. A clamp block is removably attached to the base and has a plurality of generally vertically aligned semicylindrical channels therein. By bringing together the semicylindrical channels in the base and the clamp block, a plurality of cylindrical bores are formed. Threaded fasteners secure and tighten the clamp block to the base. Aerating tines may be inserted in and removably held in the cylindrical bores. One or more magnets in the base and/or clamp block contact the tines and provide attractive forces to hold the tines in place.

The tine holder reduces or minimizes the time required to change one or more tines in an aerator, does not require repositioning several tines held by a clamp block, and does not require special tools to remove and replace tines.

BRIEF DESCRIPTION OF THE DRAWINGS

FIG. 2 is a partially exploded perspective view of a tine holder for an aerator according to a first embodiment of the invention.

FIG. 3 is an exploded perspective view of a base of a tine holder for an aerator according to a first embodiment of the invention.

FIG. 4 is an exploded perspective view of a base of a tine holder for an aerator according to a second embodiment of the invention.

DESCRIPTION OF THE PREFERRED EMBODIMENT

Figure 1:
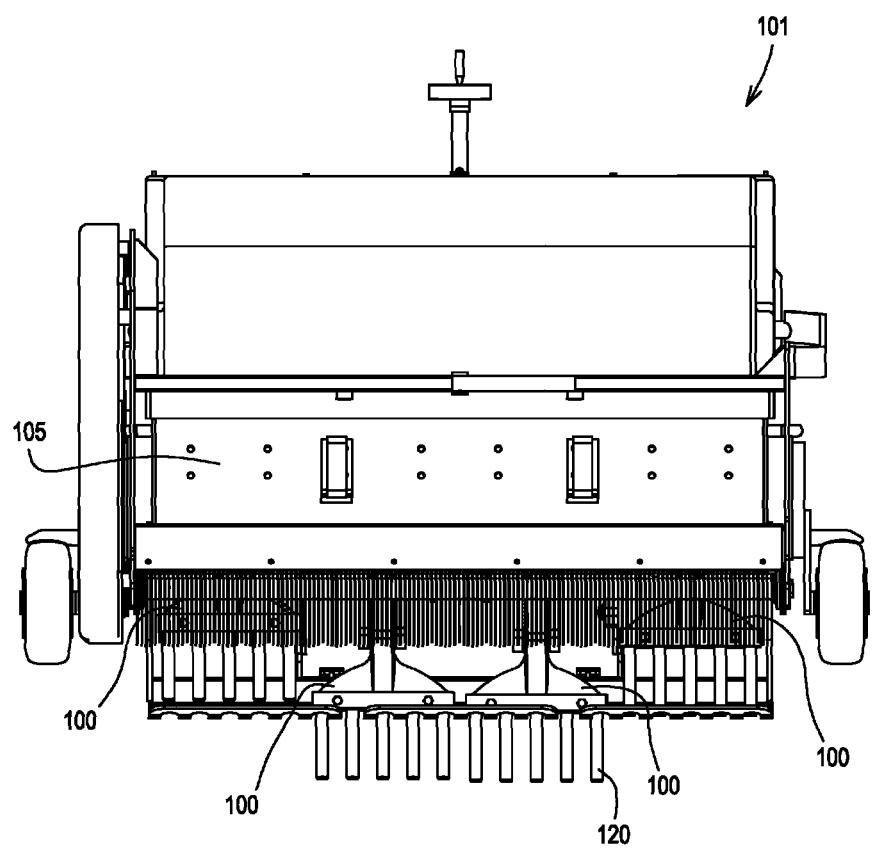
FIG. 1 is a rear view of an aerator with a tine holder according to a first embodiment of the invention.

FIGS. 1-3 show several tine holders 100 for aerator 101 according to a first embodiment of the invention. Several tine holders may be carried by and used by a walk behind or tractor mounted aerator, and are intended for use with both types of aerators. Each tine holder may have a flange 104 fastened to a link arm 103 of a walk behind or tractor mounted aerator.

In one embodiment, coring head 105 may be mounted on the rear of the aerator, either behind the rear drive wheels and tires, between the rear drive wheels and tires, or adjacent the rear axle(s). The coring head may carry a plurality of tine assemblies that reciprocate up and down by rotation of a crankshaft. Each tine assembly may have a plurality of coring tines 120 that are driven into the ground and produce holes for the purpose of aerating the turf. Each tine assembly may include a rubber dampener system that absorbs the forward motion of the aerator to help improve hole quality by minimizing hole elongation. The coring head may be raised and lowered using an hydraulic, electric or electro hydraulic lift and lower system. For example, an electric motor may power a hydraulic pump to engage a hydraulic cylinder that raises and lowers the coring head.

In one embodiment, the aerator may have an internal combustion engine supported on the frame that may be used to operate coring head 105. The internal combustion engine also may provide traction drive for the rear wheels through a mechanical transmission, or through a hydrostatic transmission with a pump to supply pressurized fluid to a single hydraulic motor or pair of hydraulic motors for rotating the rear wheels. Alternatively, the internal combustion engine may drive an alternator or generator to generate electric power for electric traction drive motors. Or the aerator may use electric storage batteries or other power supplies to generate power for the coring head and/or traction drive.

In one embodiment, each tine holder 100 may have a base 102 which may be a generally rectangular body, and a clamp block 108 removably attached to the base. The base and clamp block of each tine holder may have a plurality of semicylindrical channels 106, 110, and preferably between three and five semicylindrical channels. When the base and clamp block are joined together, each pair of semicylindrical channels forms a cylindrical bore for holding tine 120 in a generally vertical alignment when operating the aerator. Shoulders 122 at the upper end of each bore may provide a vertical stop for each tine. The cylindrical bores may be tightened to hold the tines or loosened to release the tines. Thus, the tines may be sandwiched in bores between the base and clamp block.

In one embodiment, the bores may be tightened or loosened by tightening or loosening clamp block 108 to base 102. For example, the clamp block may be tightened or loosened by using threaded fasteners 118 inserted through holes 114 in the clamp block and threaded holes 116 in the base. The bolts may be loosened sufficiently to separate the clamp block from the base to release the tines so the tines may be removed, and may be tightened sufficiently to hold the tines securely in place. Shoulder 122 help prevent vertical movement of the tines with respect to the tine holder as the tines repeatedly penetrate a surface that is being aerated. Alternatively, the clamp block may be tightened to the base using other mechanical devices known generally to those skilled in the art.

In one embodiment, permanent magnets 112 may be provided in each semicylindrical channel 106 in base 102. Each magnet may contact and attract the side of a tine. For example, each magnet may be inserted and/or embedded and/or secured in a hollow recess 124 in each channel. Thus, a magnet may be held in each channel where a tine is positioned. The magnet may be held or secured in the hollow recess by various means, including but not limited to adhesives and/or mechanical fasteners. The magnet may have a generally cylindrical shape in the embodiment shown, but also may have various other shapes such as rectangular or sleeve shape that are also considered to be within the scope of this invention. Additionally, or alternatively, a magnet also may be inserted and held in a hollow recess in each semicylindrical channel in the clamp block.

In an alternative embodiment shown in FIG. 4, permanent magnets 126 may be located at or near the top end of each bore. Each magnet 126 may contact and attract the end of a tine. For example, magnet 126 may be washer-shaped or ring-shaped so that it does not cover or block the top end of each hollow tine and allows ejection of cores. Each magnet, however, may form a stop at the top end of a solid tine. Alternatively, base 102 or clamp block 108 may be magnetized, or one or more magnets may be embedded and/or integral with the base or clamp block, and provide attractive force to one or more tines. For example, one or more magnet may extend through the base or clamp block perpendicular to the bores and may contact and attract the tines in the bores.

In one embodiment, the magnet or magnets may contact and provide sufficient attractive force to one or more tines so that the tines may remain in the bores formed between the base and clamp block even if the bores are loosened sufficiently to allow removal of the tines. For example, the magnets may hold the tines in position unless the operator manually removes the tines. Thus, if the clamp block is loosened to allow removal of the tines, the magnets provide sufficient magnetic attractive force to support the tines in a vertical alignment. Thus, the magnets provide for temporary retention of tines while one or more tines are replaced or serviced.

Having described the preferred embodiment, it will become apparent that various modifications can be made without departing from the scope of the invention as defined in the accompanying claims.

The invention claimed is:

1. An aerator tine holder, comprising:
    a clamp block removably attached to a base of the aerator tine holder, each of the clamp block and the base having a plurality of semicylindrical channels that when attached together form a plurality of cylindrical bores holding a plurality of cylindrical tines; and
    a plurality of magnets embedded in the base, each magnet contacting and supporting a cylindrical tine in a vertical alignment against the cylindrical bore when the clamp block is loosened from the base.

2. The aerator tine holder of claim 1 wherein the clamp block is removably attached to the base by threaded fasteners.

3. The aerator tine holder of claim 1 wherein the magnets are embedded in each semicylindrical channel in the base.

4. The aerator tine holder of claim 1 wherein the magnets are embedded in each semicylindrical channel in the clamp block.

5. The aerator tine holder of claim 1 wherein the magnets are embedded at a top end of each cylindrical bore.

6. An aerator tine holder, comprising:
    a plurality of aerating tines removably positioned in a plurality of generally vertically aligned bores which may be tightened to hold the tines or loosened to release the tines; and
    a plurality of magnets embedded in the bores and contacting the tines and providing attractive forces sufficient to support the tines in a vertical alignment in the bores while the bores are loosened and the tines can be removed.

7. The aerator tine holder of claim 6 wherein the tines are sandwiched in generally vertically aligned bores formed between a base and a clamp block.

8. The aerator tine holder of claim 6 wherein the magnets are embedded at upper ends of the bores.

9. An aerator tine holder, comprising:
    a base attached to a vehicle and having a plurality of generally vertically aligned semicylindrical channels therein;
    a clamp block removably attached to the base and having a plurality of generally vertically aligned semicylindrical channels therein;
    a plurality of cylindrical bores formed by bringing together the semicylindrical channels in the base and the clamp block;
    a plurality of aerating tines inserted in and removably held in the cylindrical bores; and
    a plurality of magnets embedded in at least one of the base and the clamp block and supporting the tines in a vertical alignment when the clamp block is loosened from the base.

10. The aerator tine holder of claim 9, further comprising a plurality of threaded fasteners securing and tightening the clamp block to the base.

11. The aerator tine holder of claim 9, further comprising recesses holding the plurality of magnets in the semicylindrical channels in at least one of the base and the clamp block.

12. The aerator tine holder of claim 9 wherein the plurality of magnets are embedded at upper ends of the cylindrical bores.

* * * * *